(12) United States Patent
O'Sullivan et al.

(10) Patent No.: US 10,994,633 B2
(45) Date of Patent: May 4, 2021

(54) METHOD AND SYSTEM FOR MONITORING OCCUPANCY OF A SEAT ARRANGED IN A TRANSPORTATION VEHICLE

(71) Applicant: Bombardier Transportation GmbH, Berlin (DE)

(72) Inventors: James O'Sullivan, Nottingham (GB); Benjamin Parry, Nottingham (GB)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 16/616,637

(22) PCT Filed: May 25, 2018

(86) PCT No.: PCT/EP2018/063837
§ 371 (c)(1),
(2) Date: Nov. 25, 2019

(87) PCT Pub. No.: WO2018/215658
PCT Pub. Date: Nov. 29, 2018

(65) Prior Publication Data
US 2020/0108734 A1 Apr. 9, 2020

(30) Foreign Application Priority Data

May 26, 2017 (GB) ..................................... 1708481
May 26, 2017 (GB) ..................................... 1708505

(51) Int. Cl.
*B60N 2/00* (2006.01)
*B60W 50/04* (2006.01)
(Continued)

(52) U.S. Cl.
CPC ........... *B60N 2/002* (2013.01); *B60W 50/045* (2013.01); *G06F 9/543* (2013.01); *G06Q 50/30* (2013.01);
(Continued)

(58) Field of Classification Search
CPC combination set(s) only.
See application file for complete search history.

(56) References Cited

U.S. PATENT DOCUMENTS

| 10,388,126 | B2 * | 8/2019 | Gruenbaum | ............ B61D 41/00 |
| 2002/0101110 | A1 * | 8/2002 | Mosquera | ................ B60N 2/58 |
| | | | | 297/452.58 |
| 2017/0200355 | A1 * | 7/2017 | Gruenbaum | ......... H04B 5/0031 |

FOREIGN PATENT DOCUMENTS

DE 102014209554 A1 11/2015

* cited by examiner

*Primary Examiner* — Travis R Hunnings
(74) *Attorney, Agent, or Firm* — The Webb Law Firm (57) ABSTRACT

A system for monitoring occupancy of a seat arranged in a transportation vehicle is disclosed. The system includes at least one detection device arranged in the vehicle, within the seat or near the seat, and at least one centralized occupancy management system located outside of the vehicle and at least one occupancy management system located outside of the vehicle. An occupancy displaying unit is arranged on the seat or next to the seat for providing visual information about seat occupancy. The passenger's mobile communication device is used by the system for locating the passenger inside the transportation vehicle, by means of dedicated device detection units arranged in the transportation vehicle. The centralized occupancy management system and the occupancy management system are informed in real-time about the seat's occupancy.

15 Claims, 3 Drawing Sheets

(51) Int. Cl.
  *G06F 9/54* (2006.01)
  *G06Q 50/30* (2012.01)
  *B60W 40/08* (2012.01)
  *B60W 50/00* (2006.01)
(52) U.S. Cl.
  CPC ............... *B60W 2040/0881* (2013.01); *B60W 2050/0005* (2013.01); *B60W 2050/048* (2013.01); *B60W 2300/10* (2013.01)

METHOD AND SYSTEM FOR MONITORING OCCUPANCY OF A SEAT ARRANGED IN A TRANSPORTATION VEHICLE

CROSS-REFERENCE TO RELATED APPLICATIONS

This application is the United States national phase of International Application No. PCT/EP2018/063837 filed May 25, 2018, and claims priority to United Kingdom Patent Application Nos. 1708481.5 and 1708505.1, both filed May 26, 2017, the disclosures of which are hereby incorporated by reference in their entirety.

BACKGROUND OF THE INVENTION

Field of the Invention

The present invention pertains to the field of methods and systems for enhancing user experience and improving passenger safety in public transport. The invention concerns in particular a system for monitoring occupancy of a seat arranged in a transportation vehicle.

Description of Related Art

Over the last twenty years, public transport suppliers have been developing systems for improving safety and enhancing user satisfaction. Amongst such systems, the most well-known are online booking systems which are nowadays proposed by most airline and train operator companies. Generally, online booking systems allow reservations to be made, tickets to be booked and online payments to be performed.

However, although these systems provide functionalities that are useful to passengers with respect to trip planning, which indeed greatly contribute to improve passengers' satisfaction at an early stage of the trip, they usually do not provide functionalities to improve satisfaction at a later stage of the trip, in particular during journey. For instance, even when a train ticket is booked online by a passenger, systems provided by train operators usually do not allow reservations to be made once the vehicle has set off from its point of origination. Neither do they allow availability of seats or standing areas to be known to the passenger in advance of boarding the vehicle. In that sense, systems used by operators of public transport infrastructures are not adequate.

Moreover, it is rather usual today for most operators of public transport infrastructures to make use of systems for improving safety of their infrastructures. To this end, most operators use systems for maintaining, processing and managing passengers' information. Some of these systems are for instance being used by operators for recording information in relation to trips that have been booked by passengers.

Indeed, most of the time, as soon as a passenger books a trip, no matter if the booking process is performed at the travel agency, via an online platform or at a booking desk, booking information in relation to the trip and to the passenger is automatically stored in one or more data storage facilities, some maintained by public transport operators and some maintained by regulators or authorities. In relation to a booking, a train operator usually records different kind of information in relation to the passenger and to the trip (identity, gender, seat number, destination, etc.). And, although such information is obviously useful for operational purposes, its retention always turns out to be crucial when disasters occur (e.g. crashes, terror attacks). In such unfortunate context, this information may indeed be retrieved and used by authorities for identifying potential victims. Certainly, one knows that, for diverse reasons, it is not always possible to get direct access to the victims, and sometimes the only available information on which authorities can rely in quickly determining the identity of potential victims is often limited to the original booking data that is stored by operators of public transport infrastructures. This shows how crucial the retention of such information by operators of public transport infrastructures can be.

However, systems operated today by public transport operators are not accurate enough and errors usually directly relate to the inaccuracy of the information retained, mostly because the information that they retain is not updated past the point of booking. Sometimes circumstances can occur in which someone who was declared dead in the hours following a disaster in fact fortuitously missed the incident. Such errors are directly linked to the inaccuracy of the information retained by public transport operators. In fact, the problem does not lie in the format or the type of information, but in the way it is actually collected and updated by computer systems of operators of public transport infrastructures.

Although, one might think that the risk of having inaccurate information retained is rather marginal for air transportation, since standard procedures have been put in place by airline companies to record the absence of a passenger in the booking system before the plane takes off, some examples have nonetheless shown that the risk does exist. The risk is even higher in the context of rail transportation, because existing public rail transport infrastructures do not yet provide the technical framework to allow train operators to be able to determine that a passenger has indeed boarded the train as planned with any certainty. This is also true for other types of public transport infrastructures, for instance, those that involve fleets of buses or passenger ships. Nowadays, terror attacks occur seemingly more often than in the past and the risk of retaining inaccurate information becomes more and more intolerable. Thus, in that sense also, existing systems used by operators of public transport infrastructures are not satisfactory.

The invention aims to remedy at least one of these disadvantages.

SUMMARY OF THE DISCLOSURE

It is thus an aim of the invention to provide a system for effectively monitoring occupancy of a seat arranged in a transportation vehicle. The system of the invention must also contribute to enhance passengers' satisfaction, by allowing useful information to be provided, in particular information that addresses the passengers' needs that arise not only at an early stage of the trip but all along it, preferably before or during the journey. This information can be accessed remotely, with the ability to send information back to the vehicle when required.

On the other hand, considering that public transport infrastructures are heavy machineries usually comprising a significant number of vehicles, which implies that any technical changes that need to be made to one vehicle have to be replicated to all vehicles of the fleet, the invention also aims to minimize the cost induced by the technical changes it implies.

Accordingly, the overall goal of the invention comes down to a mix between the provision of improvements in terms of the effectiveness of seat occupancy management, along with the provision of improvements in terms of passengers' satisfaction enhancement.

For conciseness, the term "vehicle" is used herein to refer to any of: road or rail vehicles, such as buses, coaches, trams or trains; vessels, such as passenger boats or ferries; or aircraft.

BRIEF DESCRIPTION OF THE DRAWINGS

Practicable embodiments of the invention are described in further detail below by way of example only with reference to the accompanying drawings, in which.

DETAILED DESCRIPTION

Figure 1:
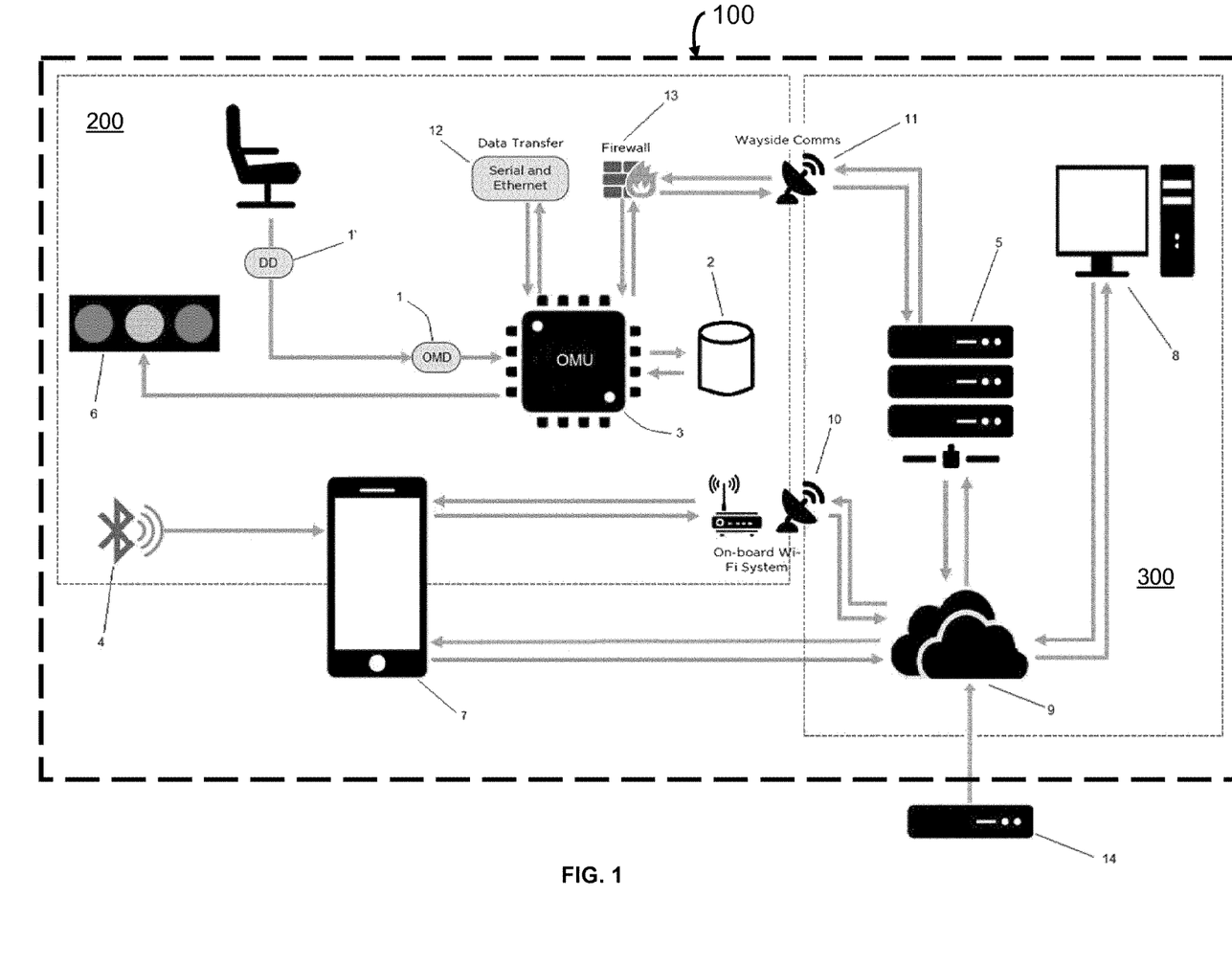
FIG. 1 is a block diagram illustrating a system for monitoring occupancy of a seat arranged in a transportation vehicle according to the invention.

A system 100 for monitoring occupancy of a seat in a transportation vehicle 200 is schematically represented on FIG. 1. In a preferred embodiment, the transportation vehicle 200 is train carriage, especially a passenger car.

The architecture of the system 100 relies on two distinct parts. A first part of the system 100 groups elements of the system which are arranged in the transportation vehicle 200. A second part of the system 100, hereinafter referred to as "the remote part 300" since it is distant from the transportation vehicle 200, assembles elements of the system which are not arranged in the transportation vehicle. For the sake of clarity, the transportation vehicle 200 is schematically represented on FIG. 1 as a first rectangle bounded by a dashed line while the remote part 300 is represented as a second rectangle bounded by a second dashed line. As shown on FIG. 1, the transportation vehicle 200 includes at least one seat, which occupancy is monitored in real-time through the system 100. Of course, although only one seat is represented on FIG. 1, the transportation vehicle 200 may contain several seats.

A mobile communication device 7 held by a passenger is used by the system 100 for location and interaction with the passenger. The mobile communication device 7 may thus be, at some stage, located in the vehicle 200 and, at another stage, remote from it. Accordingly, FIG. 1 illustrates the mobile communication device 7 only partly inside the transportation vehicle 200. Although the mobile communication device 7 is not itself part of the system 100, it plays a role within the environment provided by the system 100, as will be explained in further detail in the following paragraphs.

On the vehicle's side, the system 100 comprises an occupancy monitoring device 1, identified by the acronym "OMD" on FIG. 1, and a detection device 1', identified by the acronym "DD" on FIG. 1. Preferably, the occupancy monitoring device 1 is a computer or a microcomputer provided with hardware and software enabling at least generic computing and data storage functionalities (e.g. CPU, RAM, ROM) and means for implementing radio-frequency and/or wired communication (e.g. network adapter for TCP/IP, 3G, Wi-Fi).

In a preferred embodiment, the detection device 1' is a pressure sensor and it is arranged within the seat. As such, it can measure the force/pressure that is applied on the seat, and it generates corresponding electrical signals which are transmitted to the occupancy monitoring device 1, preferably in real time or, alternatively, periodically. This flow of electrical signals output by the detection device 1' and transmitted to the occupancy monitoring device 1 is schematically represented on FIG. 1 by an arrow which starts at the detection device 1' and ends at the occupancy monitoring device 1.

In other embodiments, the detection device 1' is a capacitive or non-capacitive sensor, which is preferably arranged within the seat. Alternatively, the detection device 1' may as well consist of a thermal sensor, an RFID tag or a near-field communication device, arranged either within the seat, next to the seat or on the seat. In other alternative embodiments, an optical sensor or a camera may be used, these being arranged either near the seat or on the seat. All those alternatives, despite differences in terms of physical parameters that are measured, provide the same functionality, namely the output of electrical signals that characterize a specific physical parameter. Depending on the device that is used, the physical parameter may thus be a force, a pressure, a capacitance, a temperature, an electromagnetic field or an amount of light. While FIG. 1 depicts one detection device 1' and one occupancy monitoring unit 1 arranged in the vehicle 200, the vehicle may of course include several detection devices 1' and several occupancy monitoring devices 1.

In the transportation vehicle 200 is also arranged an occupancy management unit 3, which is identified by the acronym "OMU" on FIG. 1. The occupancy management unit 3 takes preferably the form of a computer provided with hardware and software enabling at least generic computing and data storage functionalities (e.g. CPU, RAM, ROM) and means for implementing radio-frequency and/or wired communication (e.g. network adapter for TCP/IP, 3G, Wi-Fi). In a preferred embodiment, the occupancy management unit 3 is connected to a data storage facility 2, which, preferably, includes a memory (RAM and/or ROM) and appropriate interfaces to communicate with the occupancy management unit 3.

In the transportation vehicle 200 are further arranged at least one device detection unit 4, which preferably consists of a bluetooth beacon or an indoor positioning system. In addition, the vehicle 200 is provided with an onboard Wi-Fi system 10, which includes at least a router, a firewall 13 and serial and Ethernet communication means 12 enabling data transmission between the transportation vehicle 200 and the remote part 300 of the system 100 by means of antennas 10, 11 or any other appropriate communication devices.

Next to the seat or on the seat is also arranged an occupancy displaying unit 6. In a preferred embodiment, the occupancy displaying unit 6 includes at least a light. In other alternative embodiments, the occupancy displaying unit 6 includes a display.

Figure 2:
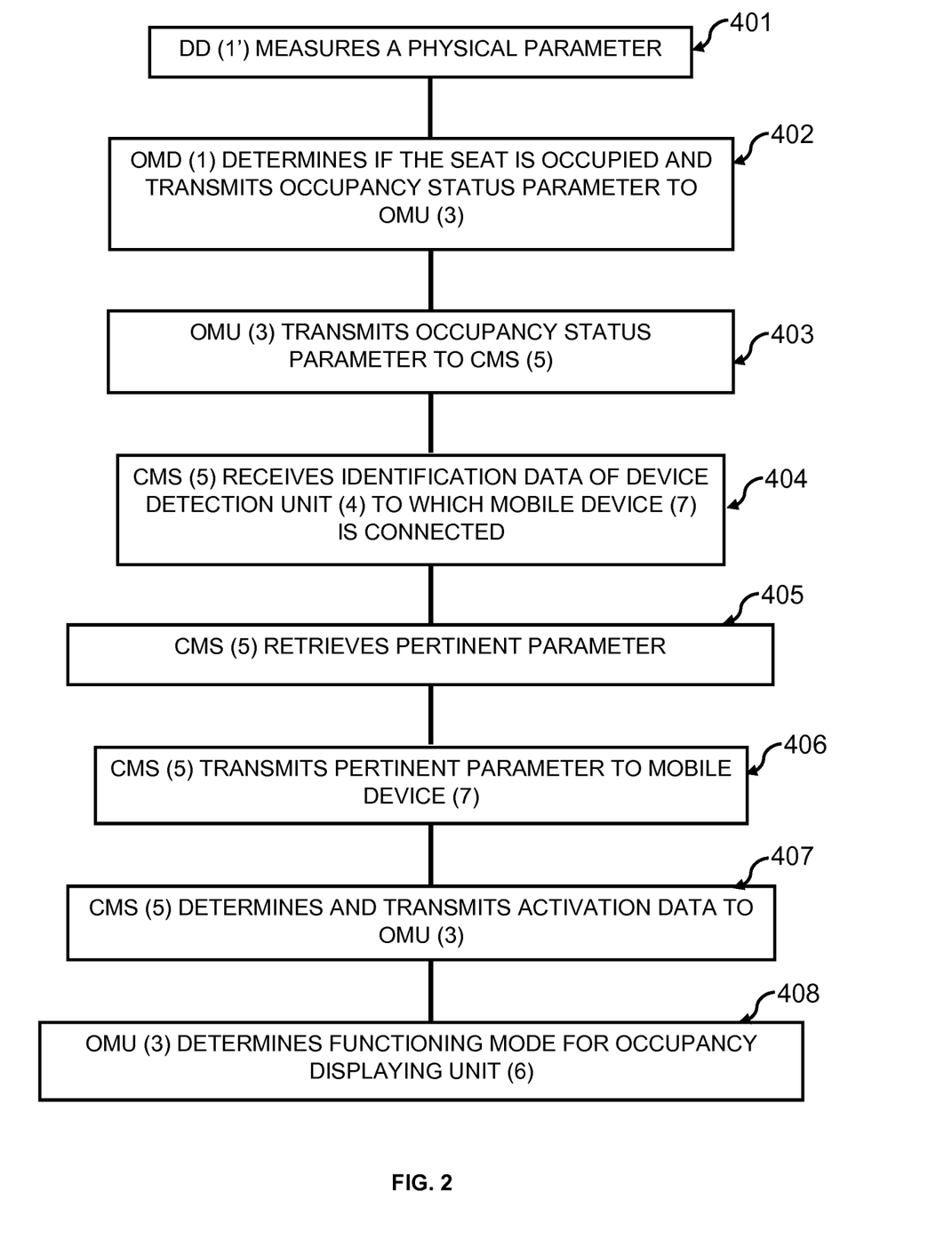
FIG. 2 is a block diagram illustrating the steps of a method performed by the system of FIG. 1.

On the other side, with respect to the remote part 300, the system 100 comprises a centralized occupancy management system 5, referred to in FIG. 2 using the acronym "CMS", which is hosted on one or more servers enabling computing, data storage and all types of communication functionalities. The system 100 includes also an operator portal 8, similarly hosted on one or more servers, some or all connected to Internet, and at least one occupancy management system 9, similarly hosted on one or more servers, which is configured to enable at least data exchange with mobile communication devices 7 such as smartphones, tablets or analogous devices.

As shown by the double-sided arrows represented on FIG. 1, all elements of the remote part 300 of the system are connected by bidirectional communication channels. Thus, data may be exchanged between the centralized occupancy management system 5 and occupancy management system 9 and between the occupancy management system 9 and the operator portal 8. Moreover, via the occupancy management system 9—which, for such purposes, may be configured to act as a gateway—data may also be exchanged between the centralized occupancy management system 5 and the operator portal 8.

A role of the centralized occupancy management system 5 is to provide an interface between the remote part 300 and the elements of the system 100 that are arranged in the vehicle 200. That is, all data coming from the transportation vehicle 200 is received by the centralized occupancy management system 5. Preferably, the centralized occupancy management system 5 includes one or more servers, some dedicated to data storage and others devoted to data retrieval and transmission. The centralized occupancy management system 5 assumes also a role of gateway with respect to the occupancy management system 9 when forwarding to the occupancy management system 9 data transmitted by the transportation vehicle 200.

Another role of the centralized occupancy management system 5 is to manage occupancy related information in relation to the seats of a fleet of transportation vehicles which occupancy is monitored by the system 100. The role undertaken by the centralized occupancy management system 5 in this respect will be discussed in further detail below in relation to FIG. 2, which schematically depicts a method for monitoring occupancy of a seat arranged in the transporting vehicle 200 which steps are performed by the system 100.

In a step 401, the detection device 1' measures a physical parameter. As previously stated, depending on the detection device 1' used, the detection device 1' measures a force or a pressure applied on the seat, an amount of light in a certain volume or area, a temperature or a capacitance. In accordance with these measurements, the detection device 1' outputs electrical signals which are transmitted to the occupancy monitoring device 1.

In a step 402, upon receipt of the electrical signals transmitted by the detection device 1', the occupancy monitoring device 1 analyses the received signals to determine if the seat is occupied by a passenger. If the detection device 1' is a pressure sensor, electrical signals received by the occupancy monitoring device 1 characterize a force or a pressure applied on the seat. In such case, the analysis performed by the occupancy monitoring device 1 consists of determining if the force applied on the seat exceeds a pre-defined threshold that is preferably stored in a memory of the occupancy monitoring device 1. When the force exceeds the pre-defined threshold, the occupancy monitoring device 1 concludes that the seat is occupied by a passenger and, consequently, it updates at least one occupancy status parameter, which is further related to a parameter that identifies the seat actually monitored. If the detection device 1' is of another type, such as the types of devices described above, a similar analysis is performed but, instead of a pressure or a force, it is, depending on the type of detection device used, a capacitance, a temperature or an amount of light which is compared to pre-defined threshold. In a step 403, the occupancy management unit 1 transmits the occupancy status parameter to the centralized occupancy management system 5. In parallel, the occupancy management unit stores the occupancy status parameter in the data storage facility 2. Consequently, following implementation of steps 402 and 403, the centralized occupancy management system is informed in real-time about occupancy of the seat.

On the other side, as soon as the mobile communication device 7 is present in the transportation vehicle 200, it automatically connects to the closest device detection unit 4. Once connected to the device detection unit 4, the mobile communication device retrieves identification data of the device detection unit. The identification data may for instance consist of the MAC address or the IP address of the device detection unit.

In a step 404, the mobile communication device 7 transmits to the occupancy management system 9 the identification data of the device detection unit 4 together with an identification parameter that uniquely identifies itself. The identification parameter may consist in the IMEI number of the mobile device or a parameter relating to a user profile used by an application that is running on the mobile communication device 7. Upon receipt of the identification data of the device detection unit and the identification parameter of the mobile communication device 7, the occupancy management system 9 forwards this data to the centralized occupancy management system 5. At that point, the centralized occupancy management system is thus informed, on one hand, about the occupancy of the seat and, on the other hand, about the device detection unit 4 to which the mobile communication device 7 is connected.

In a step 405, the centralized occupancy management system 5 uses the identification parameter of the mobile communication device to retrieve information that relates to the mobile communication device 7. Such information may for instance concern a booking made by the passenger that owns the mobile communication device 7. The centralized occupancy management system 5 may for instance determine that the passenger that owns the mobile communication device 7 has booked a seat for a certain journey. Using the identification data of the device detection unit 4 to which the mobile phone is connected it has received, the centralized occupancy management system 5 may determine that the passenger is not in the right carriage of the train. It may also determine an itinerary that the passenger should follow to reach the seat that he has booked. In other terms, the centralized occupancy management system 5 uses the identification data and its knowledge about the booking of the passenger to determine pertinent information for the passenger.

In a step 406, as soon as some pertinent information has been determined, the centralized management system 5 transmits this information to the occupancy management system 9, which forwards it to the mobile communication device 7. In accordance with information that is transmitted, the application server 9 determines a format for presenting the information to the passenger and it transmits this format, together with the pertinent information, to the mobile communication device 7. The information is then presented to the passenger via the mobile device 7. In accordance with the format that has been established by the occupancy management system 9, the information may be output in visual, audible and/or haptic elements. The passenger is thus immediately provided with useful information, especially information that may depend on his location in the transportation vehicle 200.

In a step 407, the centralized occupancy management system 5 has, for instance, determined that the passenger which made a certain booking is present in the train, even if the passenger is not yet in right carriage. The centralized occupancy management system 5 thus determines that the seat that has been booked by the passenger will soon be occupied, even if the seat remains free for some time because the passenger has still some way to go to reach his seat. In a such case, the centralized occupancy management system 5 outputs activation data and transmits such data to the occupancy management unit 3.

In a step 408, in accordance with the activation data that it has received, the occupancy management unit 3 selects a functioning mode for the occupancy displaying unit 6 that is arranged on the seat or next to the seat. In accordance with the selected functioning mode, the occupancy management unit 3 transmits commands to the occupancy displaying unit 6 that, in turn, reacts in accordance with the functioning mode that has been established by the occupancy management unit 3. If the occupancy displaying unit 6 consists of a light, as schematically depicted on FIG. 1, the functioning mode may for instance define whether the light switches from green to red. When the occupancy displaying unit 6 includes a display, the functioning mode may trigger the output of a visual message on the display, for instance a message "occupied".

The method for monitoring seat occupancy as described above is only one example that may be implemented using the system 100. Additional steps may of course be implemented, and other data may be used. For instance, specific information may be provided to assist specific types of passengers (kids, seniors, people with reduced mobility). Similarly, the centralized occupancy management system 5 may be provided with locations of staff in the transportation vehicles that it monitors, for instance by means of dedicated mobile communication devices. Such information may be extracted and provided to the passengers, for instance on an on-demand basis (where is the bar? Where are the closest free restrooms? Where is the ticket inspector?). In this respect, the application run on the mobile communication device 7 may allow more specific requests to be submitted. Accordingly, additional steps may be implemented by the occupancy management system 9 so that it forward submitted requests to the centralized occupancy management system 5 and further steps may be implemented by the centralized occupancy management system 5 to allow retrieval of specific information that can be pushed back to the mobile communication device 7 via the occupancy management system 9. Numerous services may thus be implemented by means of the system 100 of the invention. Thus, the system for monitoring seat occupancy in a transportation vehicle according to the invention, on top of providing a way to efficiently monitor in real-time seat occupancy, provides a robust architecture that may be used for providing all sorts of useful information to the passengers. In that sense, the system according to the invention also contributes to greatly enhance passengers' satisfaction.

Another role of the occupancy management system 9 is to receive and store data transmitted by a broadcasting system 14. The roles of the broadcasting system 14 and of the occupancy management system 9 are discussed in further detail below in relation to FIG. 3, which schematically depicts a method for determining at least one value of an occupancy status parameter in relation to a seat arranged in the transporting vehicle 200 which steps are performed by the system 100.

Figure 3:
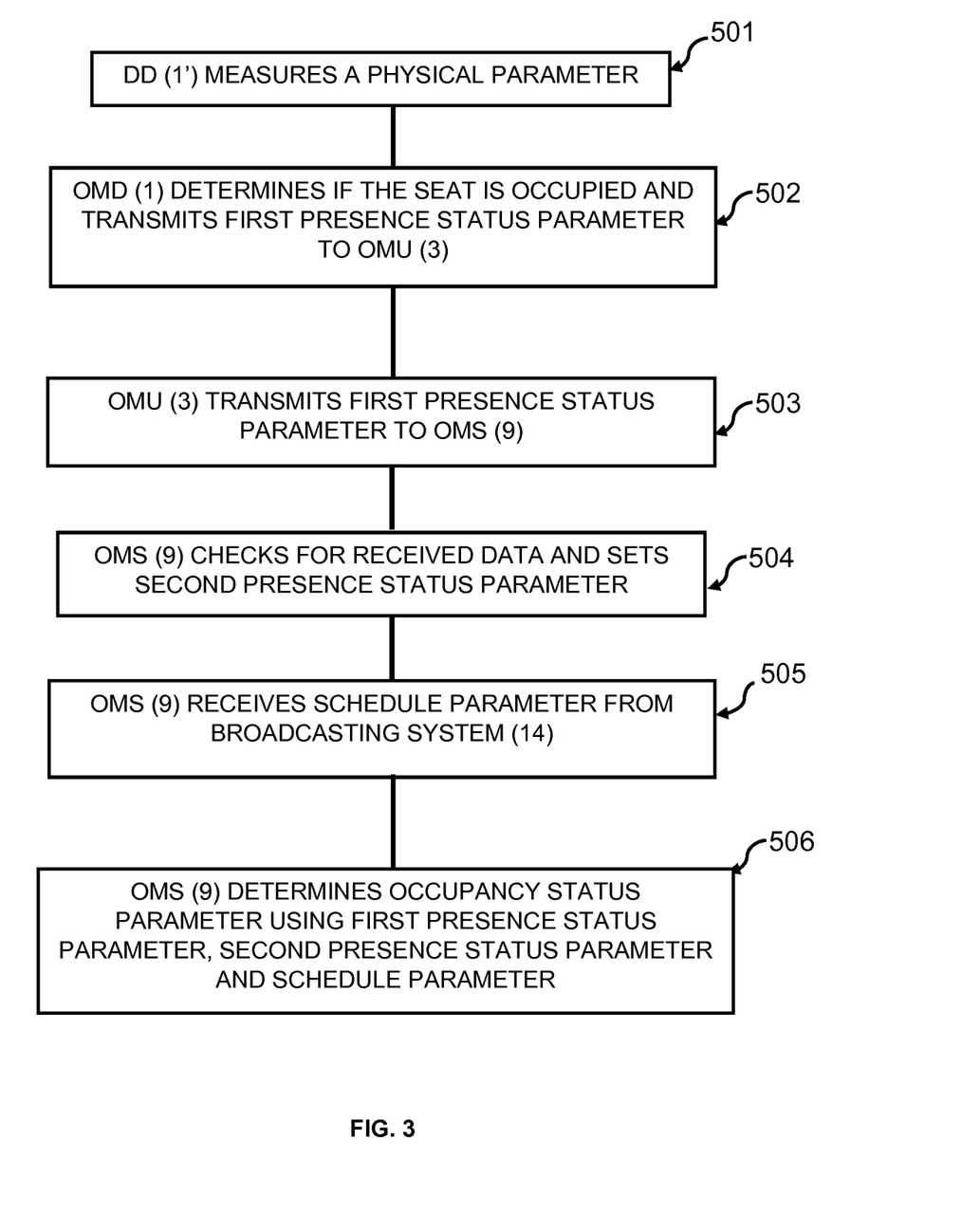
FIG. 3 is a block diagram illustrating the steps of another method performed by the system of FIG. 1.

In a step 501, the detection device 1' measures a physical parameter. As previously stated, depending on the detection device 1' used, the detection device 1' measures a force or a pressure applied on the seat, an amount of light in a certain volume or area, a temperature or a capacitance. In accordance with these measurements, the detection device 1' outputs electrical signals which are transmitted to the occupancy monitoring device 1.

In a step 502, upon receipt of the electrical signals transmitted by the detection device 1', the occupancy monitoring device 1 processes the received signals to determine if the seat is occupied by a passenger.

As previously explained, if the detection device 1' is a pressure sensor, electrical signals received by the occupancy monitoring device 1 characterize a force or a pressure applied on the seat. In such case, the analysis performed by the occupancy monitoring device 1 consists of determining if the force applied on the seat exceeds a pre-defined threshold that is preferably stored in a memory of the occupancy monitoring device 1. When the force exceeds the pre-defined threshold, the occupancy monitoring device 1 concludes that the seat is occupied by a passenger and, consequently, it determines at least one value of a first presence status parameter, which is further linked to a parameter that identifies the seat that is being monitored.

If the detection device 1' is of another type, such as the types of devices described above, a similar analysis is performed but, instead of a pressure or a force, it is, depending on the type of detection device used, a capacitance, a temperature or an amount of light which is compared to pre-defined threshold.

In a step 503, the occupancy management unit 1 transmits the first presence status parameter to the centralized occupancy management system 5. In parallel, the occupancy management unit 1 stores the first presence status parameter in the data storage facility 2. Following implementation of steps 502 and 503, the centralized occupancy management system 5 is thus informed in real-time about occupancy of the seat. Data received by the centralized occupancy management system 5 is automatically forwarded to the occupancy management system 9 ("OMS").

On the other side, as soon as the mobile communication device 7 is present in the transportation vehicle 200, it automatically connects to the closest device detection unit 4. Once connected to the device detection unit 4, the mobile communication device retrieves identification data of the device detection unit. The identification data may for instance consist of the MAC address or the IP address of the device detection unit.

In a step 504, the occupancy management system 9 checks for receipt of data identifying a device detection unit 4, data characterizing a booking change or data characterizing a booking cancellation. Accordingly, the occupancy management system 9 sets at least one value of a second presence status parameter. This process allows the occupancy management system 9 to relate booking information to effective presence of passengers in the vehicle 200.

Indeed, when a passenger is in the vehicle 200, the occupancy management system 9 is informed about the presence of the passenger through the receipt of identification data of a device detection unit 4 arranged in the vehicle transmitted by the mobile communication device 7. Also, if the occupancy management system 9 receives data characterizing a booking change or a booking cancellation, it immediately determines that the booking is invalid. Lastly, if the occupancy management system 9 determines that none of the expected data has been received, it concludes that, with respect to a certain vehicle 200, which passengers that have booked a seat that are not onboard the vehicle 200.

In parallel, in a step 505, the occupancy management system 9 receives at least one schedule parameter transmitted by a broadcasting system 14 located remotely form the vehicle 200 and the occupancy management system 9. The broadcasting system 14 delivers continuously to the occupancy management system 9 data indicating vehicles' schedules. A schedule parameter may for instance include times at which vehicles are arriving at and departing from specific locations.

In a step 506, the occupancy management system 9 uses the first presence status parameter, the second presence status parameter and the schedule parameter to determine at least one value of an occupancy status parameter. Via the first presence status parameter, the occupancy management system 9 determines occupancy of seats. Via the second presence status parameter, the occupancy management system 9 determines presence of passengers. And, via the schedule parameter, the occupancy management system 9 links these information with bookings and vehicles schedule. By processing this information logically, the occupancy management system 9 can determine in quasi real time an occupancy status for a seat arranged in a transportation vehicle 200. This allows the system 100 according to the invention to be more accurate in terms of booking information retained.

The invention claimed is:

1. A system for monitoring occupancy of a seat arranged in a transportation vehicle, the system comprising:
   at least one detection device arranged in the vehicle within the seat or in a vicinity of the seat,
   at least one centralized occupancy management system located outside of the vehicle,
   at least one occupancy management system located outside of the vehicle,
   at least one occupancy monitoring device arranged in the vehicle,
   at least one occupancy management unit arranged in the vehicle,
   at least one database recorded on a computer-readable medium arranged in the vehicle;
   at least one device detection unit arranged in the vehicle, the at least one device detection unit being adapted to communicate wirelessly with a mobile communication device, and
   at least one occupancy displaying unit arranged on the seat or in the vicinity of the seat,
   wherein the system is configured to perform the steps of:
      determining, by the at least one occupancy monitoring device, a first occupancy status parameter for the seat based on an electrical signal output by the at least one detection device,
      transmitting, by the at least one occupancy monitoring device, the first occupancy status parameter to the at least one occupancy management unit,
      transmitting, by the at least one occupancy management unit, the first occupancy status parameter to the at least one centralized occupancy management system,
      receiving, by the at least one centralized occupancy management system, identification data identifying the at least one device detection unit,
      determining, by the at least one centralized occupancy management system, at least one reservation parameter which relates to the mobile communication device,
      determining, by the at least one centralized occupancy management system, at least one pertinent parameter based on the identification data and the reservation parameter,
      transmitting, by the at least one centralized occupancy management system, the pertinent parameter to the mobile communication device,
      transmitting, by the at least one centralized occupancy management system, activation data to the at least one occupancy management unit, and
      determining, by the occupancy management unit, based on the activation data, a functioning mode of the occupancy displaying unit, or
   wherein the system is configured to perform the steps of:
      processing, by the at least one occupancy monitoring device, the electrical signal to set a first presence status parameter,
      transmitting, by the at least one occupancy monitoring device, the first presence status parameter to the at least one occupancy management unit,
      transmitting, by the at least one occupancy management unit, the first presence status parameter to the at least one occupancy management system,
      setting, by the at least one occupancy management system, a second presence parameter by checking receipt of data identifying the at least one device detection unit, data characterizing a cancellation of booking and data characterizing a change of booking,
      receiving, by the at least one occupancy management system, at least one schedule parameter in relation to the transportation vehicle, said schedule parameter being transmitted to the at least one centralized occupancy management system by a broadcasting system that is located remotely from the by the at least one occupancy management system and the vehicle, and
      determining, by the by the at least one occupancy management system, a second occupancy status parameter based on the first presence status parameter, the second presence status parameter and the schedule parameter.

2. The system of claim 1, wherein the at least one occupancy management unit comprises means for carrying out a step of storing the first occupancy status parameter or the first presence in a database recorded on a computer-readable medium arranged in the vehicle.

3. The system of claim 1, wherein the at least one detection device comprises means for carrying out a step of determining if a force applied on the seat exceeds a predefined threshold.

4. The system of claim 1, wherein the at least one detection device is arranged within the seat and comprises at least one of a pressure sensor, an optical sensor, and a thermal sensor.

5. The system of claim 1, wherein the at least one detection device comprises a capacitive sensor.

6. The system of claim 1, wherein the at least one detection device is arranged within the seat and comprises a near field communication device.

7. The system of claim 1, wherein the at least one detection device is arranged within the seat and comprises an RFID tag.

8. The system of claim 1, wherein the at least one detection device is arranged in the vicinity of the seat and comprises a camera.

9. The system of claim 1, wherein the at least one occupancy displaying unit comprises at least one of at least one light and at least one display.

10. The system of claim 1, wherein the at least one device detection unit comprises at least one of an indoor positioning system and a bluetooth device.

11. The system of claim 1, wherein the vehicle is a train carriage.

12. The system of one of claim 1, wherein the system is configured to perform the steps of:
 transmitting, by the at least one occupancy management system, activation data to the at least one occupancy management unit, wherein said activation data is determined based on the second occupancy status parameter;
 determining, by the at least one occupancy management unit, based on the activation data, a functioning mode of at least one occupancy displaying unit; and
 activating, by the at least one occupancy displaying unit, at least one of a light and a display in accordance with the functioning mode.

13. The system of one of claim 1, wherein the system is configured to perform a step of outputting, by the mobile communication device, audible, visual and/or haptic elements determined in accordance with the pertinent parameter.

14. A method of monitoring occupancy of a seat arranged in a transportation vehicle by means of a system having:
 at least one detection device arranged in the vehicle within the seat or in a vicinity of the seat,
 at least one centralized occupancy management system located outside of the vehicle,
 at least one occupancy management system located outside of the vehicle,
 at least one occupancy monitoring device arranged in the vehicle,
 at least one occupancy management unit arranged in the vehicle,
 at least one database recorded on a computer-readable medium arranged in the vehicle;
 at least one device detection unit arranged in the vehicle, the at least one device detection unit being adapted to communicate wirelessly with a mobile communication device, and
 at least one occupancy displaying unit arranged on the seat or in the vicinity of the seat,
 of the method comprising:
 determining, by the at least one occupancy monitoring device, a first occupancy status parameter for the seat based on of an electrical signal output by the at least one detection device,
 transmitting, by the at least one occupancy monitoring device, the first occupancy status parameter to the at least one occupancy management unit,
 transmitting, by the at least one occupancy management unit, the first occupancy status parameter to the at least one centralized occupancy management system,
 receiving, by the at least one centralized occupancy management system, identification data identifying the at least one device detection unit,
 determining, by the at least one centralized occupancy management system, at least one reservation parameter which relates to the mobile communication device,
 determining, by the at least one centralized occupancy management system, at least one pertinent parameter based on the identification data and the reservation parameter,
 transmitting, by the at least one centralized occupancy management system, the pertinent parameter to the mobile communication device,
 transmitting, by the at least one centralized occupancy management system, activation data to the at least one occupancy management unit, and
 determining, by the at least one occupancy management unit, based on the activation data, a functioning mode of the occupancy displaying unit.

15. A method of monitoring occupancy of a seat arranged in a transportation vehicle by means of a system having:
 at least one detection device arranged in the vehicle within the seat or in a vicinity of the seat,
 at least one centralized occupancy management system located outside of the vehicle,
 at least one occupancy management system located outside of the vehicle,
 at least one occupancy monitoring device arranged in the vehicle,
 at least one occupancy management unit arranged in the vehicle,
 at least one database recorded on a computer-readable medium arranged in the vehicle;
 at least one device detection unit arranged in the vehicle, the at least one device detection unit being adapted to communicate wirelessly with a mobile communication device, and
 at least one occupancy displaying unit arranged on the seat or in the vicinity of the seat,
 of the method comprising:
 processing, by the at least one occupancy monitoring device, the electrical signal to set a first presence status parameter,
 transmitting, by the at least one occupancy monitoring device, the first presence status parameter to the at least one occupancy management unit,
 transmitting, by the at least one occupancy management unit, the first presence status parameter to the occupancy management system,
 setting, by the at least one occupancy management system, a second presence parameter by checking receipt of data identifying the at least one device detection unit, data characterizing a cancellation of booking and data characterizing a change of booking,
 receiving, by the at least one occupancy management system, at least one schedule parameter in relation to the transportation vehicle, said schedule parameter being transmitted to the at least one centralized occupancy management system by a broadcasting system that is located remotely from the by the at least one occupancy management system and the vehicle, and
 determining, by the by the at least one occupancy management system, a second occupancy status parameter based on the first presence status parameter, the second presence status parameter and the schedule parameter.

\* \* \* \* \*

UNITED STATES PATENT AND TRADEMARK OFFICE
CERTIFICATE OF CORRECTION

PATENT NO. : 10,994,633 B2
APPLICATION NO. : 16/616637
DATED : May 4, 2021
INVENTOR(S) : James O'Sullivan et al.

Page 1 of 1

It is certified that error appears in the above-identified patent and that said Letters Patent is hereby corrected as shown below:

In the Claims

Column 11, Line 6, Claim 12, after "system of" delete "one of"

Column 11, Line 18, Claim 13, after "system of" delete "one of"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*